Patented Sept. 8, 1936

2,053,269

UNITED STATES PATENT OFFICE 2,053,269

PHTHALIDE HALIDE AND PROCESS OF MAKING IT

Melvin A. Dietrich, Wilmington, Del., and Carl S. Marvel, Urbana, Ill., assignors to E. I. du Pont de Nemours & Company, Wilmington, Del., a corporation of Delaware No Drawing. Application March 19, 1935, Serial No. 11,810

22 Claims. (Cl. 260—123)

This invention relates to the preparation of halogenated products of the following general formula:

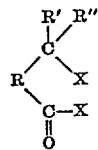

in which R is a cyclic group which may be aromatic or hydroaromatic in nature and which may contain substituents other than hydrogen atoms, X represents a halogen atom, and R' and R'' may be hydrogen atoms or alkyl or aryl groups. The invention relates particularly to the preparation of phthalide halides, more specifically to the preparation of phthalide chloride and to new products, substituted phthalide chlorides.

Phthalide chloride has been prepared by the action of phosphorus pentachloride on phthalide at 55° to 60° C.

This invention has as an object the provision of a process whereby phthalide chloride may be prepared in good yield and high degree of purity by a convenient, feasible, and economic process. A further object is the preparation of substituted phthalide chlorides. A still further object is the class of substituted phthalide chlorides thus prepared. Other objects will appear hereinafter.

These objects are accomplished by the following invention wherein a phthalyl halide, such as phthalyl chloride, is reacted with a phthalide, such as phthalide or a substituted phthalide, with or without a catalyst.

In the process of the present invention the phthalyl halide and the phthalide are thoroughly mixed in equivalent molar proportions. A catalyst such as a heavy metal halide is added in the proportion of two or three grams of catalyst per mol of phthalide chloride and the mixture is heated.

When a metallic halide is used as the catalyst the mixture is heated to a temperature of 120°–150° C. for from 3 to 5 hours, this time normally being sufficient to complete the reaction. The extent to which the reaction has been completed may be determined by allowing the mixture to cool, for example by standing overnight, with resultant crystallization of the by-product phthalic anhydride, which is removed by filtration, washed with a small quantity of benzene, dried, and weighed. This weight, compared with the weight of phthalic anhydride theoretically obtainable, serves as a good measure of the completeness of the reaction, which is represented structurally as follows:

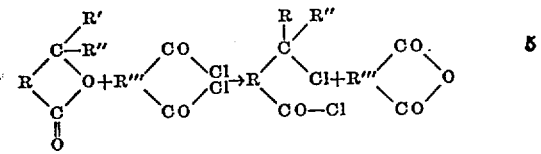

The filtrate may be heated for a further period, when necessary, to complete the reaction.

When a catalyst is used, a reaction temperature above 150° C. results in side reactions such as the formation of anthrones from phthalyl chloride and phthalic anhydride, which very naturally reduce the yield of phthalide chloride. The reaction may be carried out at temperatures above 150° C., for example 200° C. At this point with no catalyst the reaction is slow and incomplete. A small amount of phthalide chloride is however formed.

In any case, the products of the reaction after the removal of the phthalic anhydride are distilled as rapidly as possible under reduced pressure and without fractionation in order to separate them from the catalyst which may promote side reactions. This distillation is conducted at such a pressure that boiling will begin at a temperature below 165° C., since side reactions become very pronounced at higher temperatures, especially during the early part of the distillation. The distillate regardless of the method of distillation is then carefully fractionated under reduced pressure.

Having outlined the general principles and purposes of the invention, the following exemplifications thereof are added for purposes of illustration but not in limitation:

*Example 1*

Forty-five parts phthalide, 70 parts phthalyl chloride, and one part zinc chloride were mixed in a glass reaction vessel and heated in an oil bath under reflux to 130° C. for one hour. The mixture became green in color. It was then heated to 150° C. for three hours. On cooling and filtering, 37 parts of phthalic anhydride were recovered. Distillation of the liquid products resulted in 35 parts of phthalide chloride, B. P. 107°/2 mm.; 114°—115°/5 mm.;

$n_D^{20}$ 1.578, and 6 parts of unreacted phthalide. Yield, 63.5 per cent.

*Example 2*

Two hundred and sixty-eight parts phthalide, 406 parts phthalyl chloride, and 6 parts zinc chloride were heated at 130°—140° C. for five hours. The mixture was cooled, benzene added, and allowed to set overnight. On filtration 233 parts of phthalic anhydride was secured. Benzene was removed from the filtrate by evaporation and the residue distilled. There was recovered 287 parts phthalide chloride, B. P. 97°—101°/1 mm.;

$$n_D^{20} 1.5780.$$

Yield, 72 per cent.

*Example 3*

One hundred parts hexahydrophthalide, 145 parts phthalyl chloride, and 2 parts zinc chloride were heated at 150° C. for three hours and then at 130° C. for two hours longer. The mixture was cooled, benzene added, and filtered. This operation was repeated. Total phthalic anhydride recovered was 80.7 parts. The benzene was removed from the filtrate by evaporation on a steam bath and the residue distilled under reduced pressure as rapidly as possible. On redistillation there was secured 100 parts of hexahydrophthalide chloride, B. P. 91°/2 mm.;

$$n_D^{20} 1.4950.$$

Yield, 72 per cent.

*Example 4*

Thirty six parts 5-nitrophthalide, 41 parts phthalyl chloride, and 0.7 part zinc chloride were heated at 140° C. for five hours. After chilling, adding benzene, and filtering 22 parts of phthalic anhydride were secured. After removal of the benzene by evaporation, the product was sublimed yielding pale yellow crystals of 5-nitrophthalide chloride, M. P. 118°—120° C.

The process of the invention is broadly applicable to the preparation of halogenated acid halides by reacting a phthalyl halide such as phthalyl chloride with compounds containing a lactone grouping and preferably having the general formula

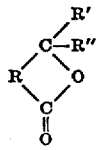

in which R is a cyclic group which may be aromatic, hydroaromatic, heterocyclic, and which may be mono-, bi-, or polycyclic. R may be substituted or unsubstituted. Thus, the invention is applicable to the preparation of halogenated acid halides from naphthalides, ar- and ac-tetrahydronaphthalides, decahydronaphthalides, chloro-, bromo-, iodo-, methyl-, and nitro-phthalides, etc. While lactones of cyclic hydroxy acids are preferred, the invention is generally applicable to lactones of hydroxy acids, and thus R' and R'' may be hydrogen atoms, alkyl, or aryl groups. R may be an aliphatic chain as occurs in the lactones of gamma-hydroxy acids.

Phthalyl chloride is preferred as the phthalyl halide, altho substituted phthalyl chlorides such as 3- and 4-nitrophthalyl chloride; 3- and 4-chlorophthalyl chloride; 3- and 4-bromophthalyl chloride; and 3- and 4-methylphthalyl chloride are effective. Phthalyl chloride per se is much preferred because of the availability of this compound and the comparative ease of separation of the reaction product thereof, phthalic anhydride, from other products of the reaction.

The terms "a phthalyl chloride" or "a phthalyl halide" in the claims represent these classes whereas the term "o-phthalyl chloride" represents the diacid chloride of orthophthalic acid.

Acid halides of other dicarboxylic acids are also operative, in particular the halides of those dicarboxylic acids which readily form inner anhydrides, e. g., succinyl chloride.

Optimum yields are obtained within the temperature range of 130° to 150° C., but the reaction is not confined to these temperatures. The temperature required for the reaction is affected by:

(a) The presence or absence of a catalyst—without a catalyst, temperatures as high as 200° C. may be necessary.

(b) The nature of the reacting substances—compounds of the aliphatic type do not react quite so readily as do compounds of the aromatic type.

(c) The possibility of undesirable side reactions so that a temperature must be chosen at which the formation of anthrones is kept at a minimum.

In general the reaction mixture is heated to a temperature such that the formation of phthalic anhydride becomes evident but below that at which the fumes of hydrogen chloride appear.

The time necessary for substantial completeness of reaction is preferably 3 to 5 hours, but smaller or greater lengths of time may be necessary inasmuch as the conditions which determine the temperature also determine the time.

Multivalent metallic halides such as the chlorides of zinc, iron, aluminum, chromium, copper and acidic compounds such as sulfuric acid or sodium acid sulfate are effective catalysts for the reaction. The metal chlorides which are effective catalysts are those of polyvalent metals whose chlorides in aqueous solution dissociate to give an acid reaction.

The purification of phthalide chloride or other lactone chloride may be accomplished by various means, including distillation, crystallization from an inert solvent, or sublimation. For certain purposes the reaction product may be employed directly in other syntheses, the only purification necessary being the removal of phthalic anhydride by filtration after cooling.

The process may be employed as a continuous process wherein the reaction proceeds under reduced pressure and at a temperature at which the desired products are removed by distillation.

Phthalide chloride and the substituted phthalide chlorides are valuable as intermediates in the preparation of dyestuffs, pharmaceuticals, perfumes, and modified cellulose derivatives. Hexahydrophthalide chloride is of particular interest in the last two fields.

Previous methods for the preparation of phthalide chloride involved the reaction of phosphorus pentachloride with phthalide or the chlorination of o-toluyl chloride. Both of these methods suffer from the disadvantage that higher chlorinated compounds are obtained, for example, alpha, alpha'- dichloro-o-toluyl chloride or phthalylene tetrachloride. These by-products are difficult of separation from the desired end products, and both methods involve careful temperature control. Even under these conditions, yields of the desired products are low, being around 25% to 30%. In the process of the present invention, however, the reaction product is not contaminated with higher chlorinated products, and the yield is good, being in the neighborhood of 70% to 75%.

The above description and examples are intended to be illustrative only. Any modification of or variation therefrom which conforms to the spirit of the invention is intended to be included within the scope of the claims.

We claim:

1. Process for the preparation of a phthalide chloride, which comprises heating about 70 parts of o-phthalyl chloride within 45 parts of phthalide in the presence of one part of zinc chloride for four hours between 130°–150° C. and separating the phthalide chloride by filtration and distillation.

2. In a process for the preparation of a phthalide chloride, the step which comprises heating o-phthalyl chloride with phthalide at a temperature of 130°–150° C. for three to five hours in the presence of a polyvalent metal chloride.

3. In a process for the preparation of a phthalide chloride, the step which comprises heating o-phthalyl chloride with phthalide at a temperature of 130°–150° C. for three to five hours in the presence of a polyvalent metal chloride at a temperature such that phthalic anhydride is formed in substantial amounts but below that at which hydrogen chloride is formed in substantial amounts and discontinuing the heating when substantially the theoretical amount of phthalic anhydride has been formed.

4. In a process for the preparation of a phthalide chloride, the step which comprises heating o-phthalyl chloride with a phthalide in the presence of a polyvalent metal chloride at a temperature such that phthalic anhydride is formed in substantial amounts but below that at which hydrogen chloride is formed in substantial amounts and discontinuing the heating when substantially the theoretical amount of phthalic anhydride has been formed.

5. In a process for the preparation of a substituted phthalide chloride, the step which comprises heating o-phthalyl chloride with a substituted phthalide in the presence of a polyvalent metal chloride at a temperature such that phthalic anhydride is formed in substantial amounts but below that at which hydrogen chloride is formed in substantial amounts and discontinuing the heating when substantially the theoretical amount of phthalic anhydride has been formed.

6. In a process for the preparation of a phthalide halide, the step which comprises heating an o-phthalyl halide with a phthalide in the presence of a polyvalent metal chloride at a temperature such that phthalic anhydride is formed in substantial amounts but below that at which hydrogen halide is formed in substantial amounts and discontinuing the heating when substantially the theoretical amount of phthalic anhydride has been formed.

7. In a process for the preparation of a substituted phthalide halide, the step which comprises heating an o-phthalyl halide with a substituted phthalide in the presence of a polyvalent metal chloride at a temperature such that phthalic anhydride is formed in substantial amounts but below that at which hydrogen halide is formed in substantial amounts and discontinuing the heating when substantially the theoretical amount of phthalic anhydride has been formed.

8. In a process for the preparation of a chloride of an hydroxy acid lactone, the step which comprises reacting a hydroxy acid lactone with o-phthalyl chloride in the presence of a polyvalent metal chloride at a temperature such that phthalic anhydride is formed in substantial amounts but below that at which hydrogen chloride is formed in substantial amounts and discontinuing the heating when substantially the theoretical amount of phthalic anhydride has been formed.

9. In a process for the preparation of chlorides of hydroxy acid lactones, the step which comprises reacting a hydroxy acid lactone with o-phthalyl chloride in the presence of a polyvalent metal chloride at a temperature such that phthalic anhydride is formed in substantial amounts but below that at which hydrogen chloride is formed in substantial amounts and discontinuing the heating when substantially the theoretical amount of phthalic anhydride has been formed.

10. In a process for the preparation of a halide of an hydroxy acid lactone, the step which comprises reacting an hydroxy acid lactone with an o-phthalyl halide in the presence of a polyvalent metal chloride at a temperature such that phthalic anhydride is formed in substantial amounts but below that at which hydrogen halide is formed in substantial amounts and discontinuing the heating when substantially the theoretical amount of phthalic anhydride has been formed.

11. A substituted phthalide halide.

12. A substituted phthalide chloride.

13. Hexahydrophthalide chloride.

14. 5-Nitrophthalide chloride.

15. In a process for the preparation of a phthalide chloride, the step which comprises heating o-phthalyl chloride with a phthalide in the presence of a polyvalent metal chloride at a temperature of 130° to 150° C., and discontinuing the heating when substantially the theoretical amount of phthalic anhydride has been formed.

16. In a process for the preparation of a substituted phthalide chloride, the step which comprises heating o-phthalyl chloride with a substituted phthalide in the presence of a polyvalent metal chloride at a temperature of 130° to 150° C., and discontinuing the heating when substantially the theoretical amount of phthalic anhydride has been formed.

17. In a process for the preparation of a phthalide halide, the step which comprises heating an o-phthalyl halide with a phthalide in the presence of a polyvalent metal chloride at a temperature of 130° to 150° C., and discontinuing the heating when substantially the theoretical amount of phthalic anhydride has been formed.

18. In a process for the preparation of a substituted phthalide halide, the step which comprises heating an o-phthalyl halide with a substituted phthalide in the presence of a polyvalent metal chloride at a temperature of 130° to 150° C., and discontinuing the heating when substantially the theoretical amount of phthalic anhydride has been formed.

19. In a process for the preparation of a chloride of an hydroxy acid lactone, the step which comprises reacting a hydroxy acid lactone with o-phthalyl chloride in the presence of a polyvalent metal chloride at a temperature of 130° to 150° C., and discontinuing the heating when substantially the theoretical amount of phthalic anhydride has been formed.

20. In a process for the preparation of chlorides of hydroxy acid lactones, the step which comprises reacting a hydroxy acid lactone with o-phthalyl chloride in the presence of a polyvalent metal chloride at a temperature of 130° to 150° C., and discontinuing the heating when substantially the theoretical amount of phthalic anhydride has been formed.

21. In a process for the preparation of a halide of a hydroxy acid lactone, the step which comprises reacting a hydroxy acid lactone with an o-phthalyl halide in the presence of a polyvalent metal chloride at a temperature of 130° to 150° C., and discontinuing the heating when substantially the theoretical amount of phthalic anhydride has been formed.

22. A process for the preparation of a phthalide chloride which comprises causing an o-phthalyl chloride to react with a phthalide in the presence of a polyvalent metal chloride.

MELVIN A. DIETRICH.
CARL S. MARVEL.

---

CERTIFICATE OF CORRECTION.

Patent No. 2,053,269.     September 8, 1936.

MELVIN A. DIETRICH; ET AL.

It is hereby certified that error appears in the printed specification of the above numbered patent requiring correction as follows: Page 3, first column, line 15, claim 1, for "within" read with; and that the said Letters Patent should be read with this correction therein that the same may conform to the record of the case in the Patent Office.

Signed and sealed this 5th day of January, A. D. 1937.

Henry Van Arsdale
Acting Commissioner of Patents.

(Seal·

20. In a process for the preparation of chlorides of hydroxy acid lactones, the step which comprises reacting a hydroxy acid lactone with o-phthalyl chloride in the presence of a polyvalent metal chloride at a temperature of 130° to 150° C., and discontinuing the heating when substantially the theoretical amount of phthalic anhydride has been formed.

21. In a process for the preparation of a halide of a hydroxy acid lactone, the step which comprises reacting a hydroxy acid lactone with an o-phthalyl halide in the presence of a polyvalent metal chloride at a temperature of 130° to 150° C., and discontinuing the heating when substantially the theoretical amount of phthalic anhydride has been formed.

22. A process for the preparation of a phthalide chloride which comprises causing an o-phthalyl chloride to react with a phthalide in the presence of a polyvalent metal chloride.

MELVIN A. DIETRICH.
CARL S. MARVEL.

CERTIFICATE OF CORRECTION.

Patent No. 2,053,269.  September 8, 1936.

MELVIN A. DIETRICH; ET AL.

It is hereby certified that error appears in the printed specification of the above numbered patent requiring correction as follows: Page 3, first column, line 15, claim 1, for "within" read with; and that the said Letters Patent should be read with this correction therein that the same may conform to the record of the case in the Patent Office.

Signed and sealed this 5th day of January, A. D. 1937.

Henry Van Arsdale
Acting Commissioner of Patents.

(Seal·

CERTIFICATE OF CORRECTION.

Patent No. 2,053,269.

September 8, 1936.

MELVIN A. DIETRICH, ET AL.

It is hereby certified that error appears in the printed specification of the above numbered patent requiring correction as follows: Page 3, first column, line 15, claim 1, for "within" read with; and that the said Letters Patent should be read with this correction therein that the same may conform to the record of the case in the Patent Office.

Signed and sealed this 5th day of January, A. D. 1937.

Henry Van Arsdale
Acting Commissioner of Patents.

(Seal·